Figure 1:
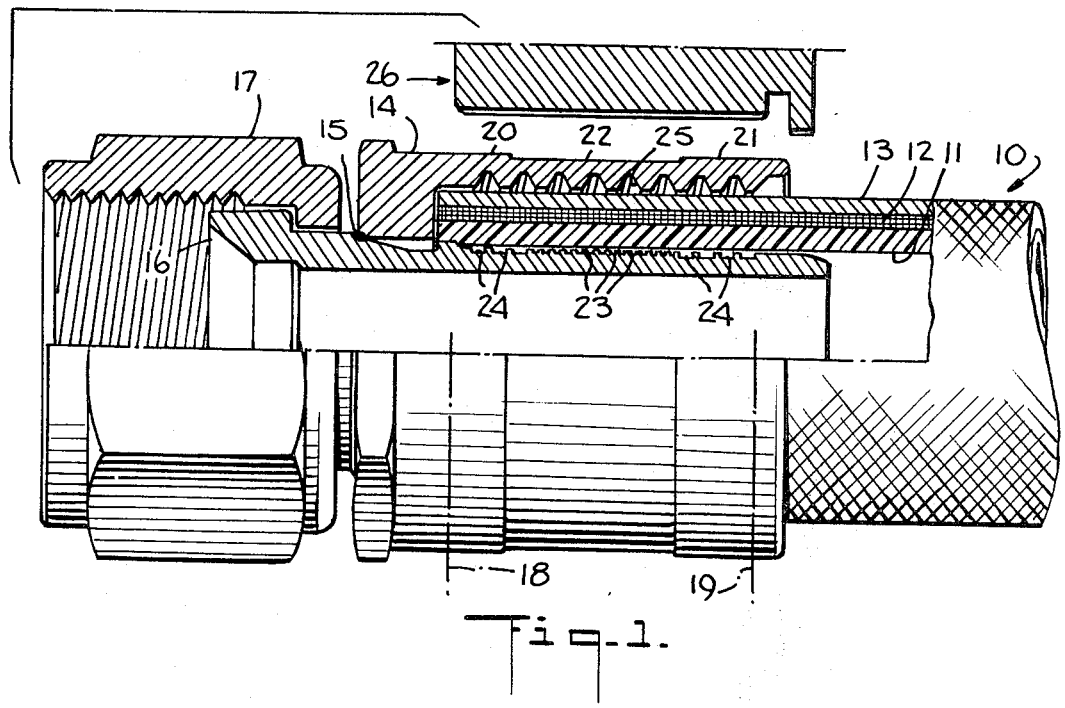

United States Patent

[11] 3,539,207

[72] Inventor John B. Harris
 Clifton, New Jersey
[21] Appl. No. 803,243
[22] Filed Feb. 28, 1969
[45] Patented Nov. 10, 1970
[73] Assignee Resistoflex Corporation
 Roseland, New Jersey
 a corporation of New York

[54] SWAGED-TYPE HOSE FITTING AND METHOD OF ASSEMBLY
10 Claims, 2 Drawing Figs.

[52] U.S. Cl. .................................................. 285/256,
 285/259, 29/508
[51] Int. Cl. ........................................................ F16l 33/20
[50] Field of Search ............................................ 29/508;
 285/149, 256, 259, 382

[56] References Cited
UNITED STATES PATENTS

| 2,278,239 | 3/1942 | Butler | 285/256X |
| 2,550,583 | 4/1951 | Millar | 285/259X |
| 2,888,277 | 5/1959 | Melsom | 285/256X |
| 3,245,699 | 4/1966 | Petermann | 285/256X |

FOREIGN PATENTS

| 1,030,485 | 5/1966 | Great Britain | 285/256 |
| 1,038,712 | 8/1966 | Great Britain | 285/149 |

Primary Examiner—Dave W. Arola
Attorney—Ward, McElhannon, Brooks & Fitzpatrick

ABSTRACT: A swaged fitting is described wherein the outer diameter of a cylindrical socket has an intermediate section of lesser diameter than the end portions such that after swaging the end portions are contracted to a greater extent than the intermediate portions. The nipple has annular grooves of smaller dimension along its intermediate section than at either end in order to provide improved sealing.

Patented Nov. 10, 1970

3,539,207

INVENTOR.
JOHN B. HARRIS
BY
ATTORNEYS

3,539,207

SWAGED-TYPE HOSE FITTING AND METHOD OF ASSEMBLY

DISCLOSURE

The present invention relates to a hose fitting and, more particularly, to a fitting of the type having a nipple for insertion within the end of a hose and a socket for squeezing the hose wall against the nipple. Fittings of this type are generally referred to as swaged or crimped.

The purpose of a hose fitting is to both anchor a coupling or the like to the end of a hose and to establish a satisfactory fluid seal. Whether or not a given fitting is satisfactory for a particular purpose depends upon both the parameters of use and the nature of the hose to which the fitting is to be attached. As the pressure requirements increase along with the need for improved reliability, the limitations of previously known fittings become evident.

The aerospace industry continues to create a demand for hose lines with improved performance capabilities. This is particularly true in connection with lines made with hose having a liner of polytetrafluoroethylene (P.T.F.E.) resin, a substantially inelastic plastomeric material subject to cold flow. Such hose lines are generally reinforced with outer layers of wire armor applied either by spiral wrapping or braiding. Considerable difficulty is encountered in establishing reliable fluid seals when securing a fitting to such a hose line and much effort has been directed along this line.

It is, therefore, an object of the present invention to provide a hose fitting for use with P.T.F.E. armored hose or the like having better performance characteristics than those fittings heretofore known.

In accordance with an aspect of the present invention, there is provided a hose end fitting of the swageable type for use with a hose having a liner of a substantially inelastic plastomeric material subject to cold flow and an outer reinforcing layer, the fitting comprising when in assembled relationship: prior to swaging a tubular nipple portion dimensioned to fit within the liner of the hose, and a socket portion dimensioned to surround the reinforcing layer above the nipple portion, the socket portion having a cylindrical outer surface at least within a swaging zone of given axial dimension, the swaging zone being divided into an intermediate zone bordered by opposite end zones with the diameter of the surface within the intermediate zone being smaller than within the end zones. By swaging the socket portion until the swaged surface thereof has a substantially uniform diameter throughout the swaging zone, improved control is obtained of the squeeze developed upon the hose to which the fitting is secured. The fluid seal obtained between the fitting and the liner of the hose depends primarily upon providing the radially outer surface of the nipple portion with a plurality of narrow, shallow, closely spaced, annular grooves with vertical sidewalls contained within an axial region in substantial juxtaposition to the intermediate zone of the socket portion, and with means for minimizing or preventing flow of the liner material out of said axial region.

Figure 2:
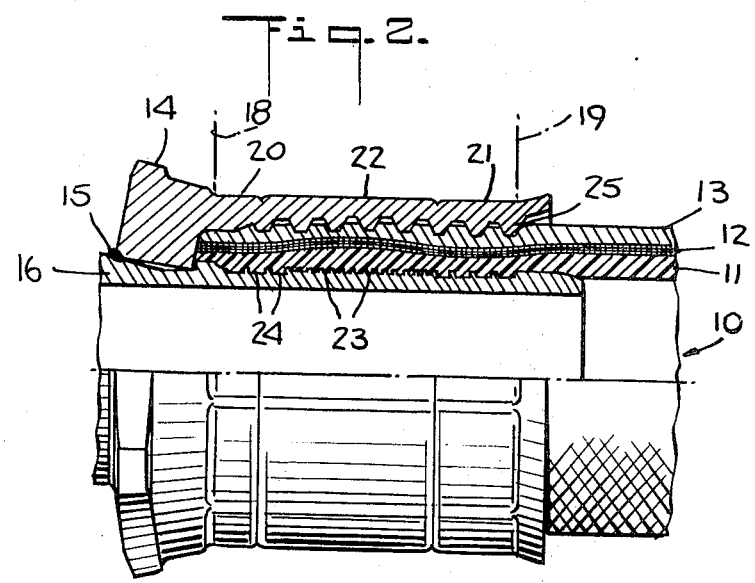

The invention will be better understood after reading the following detailed description of the presently preferred embodiment thereof with reference to the appended drawings in which:

FIG. 1 is an elevational view partly in section showing the hose end fitting in relation to the end of a length of hose prior to swaging, along with a fragment of a swaging die shown for purposes of explanation; and FIG. 2 is a view partly in section showing the assembly after the socket has been swaged.

Reference should now be had to the drawings wherein the same reference numerals are used throughout to designate the same or similar parts.

For purpose of illustration, there has been shown at 10 a hose having a liner 11 of P.T.F.E. resin (a substantially inelastic plastomeric material subject to cold flow), an intermediate reinforcing layer 12 consisting of a plurality of helically wrapped layers of steel wire, each layer being wrapped in the opposite direction from the immediately adjacent layer, and an outer sheath of braided wire 13. It is to be understood that the invention is not limited in its use to hose of this particular construction but may be used with all of the various forms of P.T.F.E. hose presently on the market and with hose of different materials but having the same general characteristics.

The end fitting consists of a socket portion 14 joined by a web 15, produced by welding, to a nipple portion 16. This procedure for producing a one-piece end fitting forms no part of the present invention but is described and claimed in my copending application Ser. No. 666,249, filed Sept. 8, 1967, and assigned to the same assignee as the present invention.

Again, for purpose of illustration, a swivel nut 17 is shown mounted on the end of the nipple member 16. It should be apparent that the swivel nut can be replaced by a male threaded end in known manner or by any other connector arrangement.

The socket portion 14 is provided with a cylindrical outer surface having a swaging zone lying approximately between the two broken lines 18 and 19. The swaging zone is characterized by end areas 20 and 21 of one diameter and an intermediate area 22 of lesser diameter. The actual difference in diameter will be only a few thousandths of an inch, e.g., .005 inch.

The radially outer surface of the nipple portion 16 which telescopes within the hose liner 11 is formed with a plurality of narrow, shallow, closely spaced, annular grooves 23 with vertical sidewalls. The grooves 23 are contained within an axial region which is in substantial juxtaposition to the intermediate area 22 of the socket portion. In a typical construction the grooves 23 have a depth of approximately .012 inch and a width of approximately .018 inch with approximately .018 inch between adjacent grooves.

The radially outer surface of the nipple portion 16 is further formed with two regions each containing a plurality of wider, deeper, but similarly spaced annular grooves 24 with vertical sidewalls. The two regions containing the grooves 24 are located adjacent respective opposite ends of the axial region containing the grooves 23. Typically, each of the grooves 24 has a depth of approximately .017 inch, a width of approximately .054 inch, with inter-groove spacing of approximately .018 inch.

The socket portion 14 has a ribbed radially inner surface for engaging the reinforcing layer of the hose. The ribbed surface is provided by a flattop thread 25. As shown, the ribs provided by the thread are distributed throughout an area substantially coextensive with the swaging zone and with the tops of the ribs being everywhere equidistant from the longitudinal axis of the fitting.

After disposing the fitting on the end of the hose, as shown in FIG. 1, it is necessary to swage or radially crimp the socket. For this purpose use may be made of a swaging tool such as described in U.S. Pat. No. 3,093,182, issued June 11, 1963, on an application of Alton S. Vanderhoof and assigned to the same assignee as the present invention. There is shown generally at 26 in FIG. 1 of the present application the operative face of a swaging die of the type described in the aforesaid patent.

After swaging, the assembly will take the form shown in FIG. 2 of the present application. It should be observed that the outer surface of the socket portion 14 containing the areas 20, 21, and 22 is now of uniform diameter between the boundaries 18 and 19 of the swaging zone. However, it should be observed that the tops of the thread 25 now lie on a somewhat barrel-shaped surface rather than on a cylindrical surface. This results from the fact that the metal of the socket in the areas 20 and 21 has been deformed or contracted to a greater extent than the metal in the intermediate area 22. Also observable is the fact that the material of the liner 11 has now been forced into the grooves 23 and 24 of the nipple portion 16.

Considering the dimension set forth above, the inner diameter of the socket (the mean inner diameter) has its radius reduced as a result of swaging by .005 inch more at the ends than at its intermediate portion. But the larger grooves 24 are .005 inch deeper than the smaller grooves 23. Hence, the radial squeeze on the hose wall is substantially uniform throughout the swaging zone. However, the grooves 24 are also wider than grooves 23 giving rise to less volume compaction of the hose wall in the region of the former. It is believed that the greater depth of penetration of the ribs between the grooves 24 into the liner material prevents flow of the liner material out of the small groove region even under high temperature aging. At the same time, the use of the larger grooves 24, probably due to the lesser compaction, has been found effective in avoiding shearing of the liner material under normal hose operating conditions. It will be found that if small grooves are employed throughout the entire length of the nipple such shearing will take place under operating pressure.

It has also been found that if a nipple constructed as shown in the present application is attempted to be used with a socket of prior construction, sufficient contraction to obtain the necessary fluid seal and anchoring of the fitting to the hose will result in a slight inward bowing of the nipple portion at its intermediate region. This is avoided by tailoring the contraction of the socket in accordance with the procedure outlined above.

A hose assembly constructed in accordance with the present invention is insensitive to leakage after high temperature aging. Furthermore, the end fitting does not require after the socket is swaged the subsequent expansion of the bore of the nipple as taught in U.S. Pat. No. 2,865,094, issued Dec. 23, 1958, on an application of Irving D. Press, and assigned to the same assignee as the present application.

Thus, there is provided by the present invention a method for controlling the distribution of the swaging pressure in the sealing area of an end fitting. That is, the outside diameter of the socket is slightly reduced in diameter intermediate its ends so as to cooperate with the groove volume in the underlying portion of the nipple. The groove volume in the nipple surface is greater on either side of the intermediate zone. Therefore, when the socket is swaged, the center portion travels less to allow for the lesser volume of the liner material able to enter the nipple grooves. In this manner the compression on the hose wall is maintained more optimum throughout its length.

Having described the invention with reference to a presently preferred embodiment thereof, it should be apparent to those skilled in the art to which the invention pertains that various changes may be made therein without departing from the true spirit of the invention as defined in the appended claims.

I claim:

1. A hose end fitting of the swageable type for use with a hose having a liner of a substantially inelastic plastomeric material subject to cold flow and an outer reinforcing layer, said fitting comprising when in assembled relationship prior to swaging: a tubular nipple portion dimensioned to fit within the liner of said hose, and a socket portion dimensioned to surround said reinforcing layer above the nipple portion, said socket portion having a cylindrical outer surface at least within a swaging zone of given axial dimension, the swaging zone being divided into an intermediate zone bordered by opposite end zones with the diameter of said surface within said intermediate zone being smaller than within said end zones, said nipple portion having a radially outer surface which is formed with a plurality of narrow, shallow, closely spaced, annular grooves having a greater width than depth and vertical sidewalls contained within an axial region in substantial juxtaposition to said intermediate zone of said socket portion.

2. A hose end fitting according to claim 1 wherein the radially outer surface of said nipple portion is further formed with two regions each containing a plurality of annular grooves with vertical sidewalls which, compared with said previously mentioned annular grooves, are wider and deeper, but similarly spaced, said two regions being located adjacent respective opposite ends of said axial region, the dimensioning of said wider and deeper grooves being chosen relative to the nature of said liner material so as to prevent shearing of the liner material under normal hose operating conditions.

3. A hose end fitting according to claim 2, wherein the socket portion has a ribbed radially inner surface for engaging the reinforcing layer of said hose, the ribs being distributed throughout an area at least coextensive with said swaging zone, the tops of the ribs being everywhere equidistant from the longitudinal axis of the fitting.

4. A hose end fitting according to claim 3, wherein the ribbed surface of said socket portion is provided by a flat-topped thread.

5. A hose end fitting according to claim 1, wherein the socket portion has a ribbed radially inner surface for engaging the reinforcing layer of said hose, the ribs being distributed throughout an area at least coextensive with said swaging zone, the tops of the ribs being everywhere equidistant from the longitudinal axis of the fitting.

6. An end fitting and hose assembly comprising: a length of hose having a liner of a substantially inelastic plastomeric material subject to cold flow and an outer reinforcing layer, a tubular nipple portion disposed within the liner of said hose at an end thereof, and a socket portion surrounding said reinforcing layer above said nipple portion, said socket portion having a zone of given axial length which has been radially contracted to a uniform diameter throughout said zone to compress the hose end against the outer surface of said nipple portion, end regions of said zone having been contracted to a greater extent than the intermediate region therebetween, said outer surface of said nipple portion having formed therein a plurality of narrow, shallow, closely spaced, annular grooves having a greater width than depth and vertical sidewalls contained within an axial region in substantial juxtaposition to said intermediate region of said socket portion.

7. An end fitting and hose assembly according to claim 6, wherein the radially outer surface of said nipple portion is further formed with two regions each containing a plurality of annular grooves with vertical sidewalls which, compared with said previously mentioned annular grooves, are wider and deeper, but similarly spaced, said two regions of the nipple portion being located adjacent respective opposite ends of said axial region, all of said grooves in said two regions of the nipple portion being substantially filled by said liner material.

8. An end fitting and hose assembly according to claim 7, wherein the inner surface of said socket portion is shaped and dimensioned and cooperates with said nipple portion to develop substantially uniform squeeze on said hose throughout the area which is coextensive with the contracted zone of the socket portion.

9. A hose end fitting of the swageable type for use with a hose having a liner of substantially inelastic plastomeric material subject to cold flow and an outer reinforcing layer, said fitting comprising when in assembled relationship prior to swaging: a tubular nipple portion dimensioned to fit within the liner of said hose, and a socket portion dimensioned to surround said reinforcing layer above said nipple portion, said nipple portion having a radially outer cylindrical surface containing within an intermediate axial region a plurality of narrow, shallow, closely spaced, annular grooves with vertical sidewalls, and within regions on either side of said intermediate region a plurality of annular grooves with vertical sidewalls which, compared with said previously mentioned annular grooves, are wider and deeper, said wider and deeper grooves being spaced such that the total groove volume provided thereby within a given axial distance is greater than the total groove volume provided by the grooves in said intermediate region over the same distance as said given axial distance, said socket portion being shaped and dimensioned, where it overlies in juxtaposition said grooved regions of said nipple portion, for cooperating with said nipple portion to develop substantially uniform squeeze on the end of a hose interposed therebetween after the socket portion has been radially contracted by swaging.

10. A hose end fitting according to claim 9, wherein said socket portion is provided with a cylindrical outer surface with a swaging zone of given axial dimension to overlie at least said grooved regions of the nipple portion, said swaging zone being divided into an intermediate zone bordered by opposite end zones with the diameter of said surface of the socket portion within said intermediate zone being smaller than within said end zones.